Patented May 24, 1932

1,860,098

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

SYNTHETIC RESIN

No Drawing.      Application filed July 20, 1931. Serial No. 552,075.

This invention relates to composite synthetic resins and more particularly to composite resins containing polyhydric alcohol-organic acid resins admixed with synthetic resins of other types.

It has been proposed in the past to use composite synthetic resins for various purposes, such as molding compounds, enamels, lacquers, impregnating compounds, and the like. More particularly, composite resin compositions containing mixtures of polyhydric alcohol-organic acid resins with other types of synthetic resins, such as for example, phenolaldehyde resins, aldehyde urea resins, and the like, have been used where the different characteristics of the synthetic resins complement each other. Thus, for example, the superior flexibility of the polyhydric alcohol-organic acid resins has been utilized to compensate for the brittleness of some of the other synthetic resins, particularly, of the phenolaldehyde type.

The present invention is directed to composite synthetic resin compositions containing at least one modified polyhydric alcohol-organic acid resin with at least one synthetic resin of a different type. The modified polyhydric alcohol-organic acid resins, covered by the present invention, are those in which at least a portion of the organic acid is substituted by phthalide or phthalide derivatives, such as substituted phthalides, hydrogenated phthalides, and the like. These resins are prepared by reacting a polyhydric alcohol such as glycerin with an organic acid, for example, phthalic anhydride, and phthalide or substituted phthalides. The invention includes not only resins containing only single acids, for example a single dicarboxylic acid in addition to the phthalide, but also includes resins in which other acids are present such as, for example, monocarboxylic acids. The fact that phthalide may be used to replace part of the acids in polyhydric alcohol-organic acid resins with desirable improvements in the physical and chemical characteristics of the products opens up a wide field of utility, particularly in combination with other synthetic resins. In general the phthalide modified resins are soluble in solvents which will dissolve the unmodified resins but owing to the fact that phthalide, which is the lactone of oxymethyl benzoic acid, contains an aliphatic alcoholic hydroxyl the solubility of the products in any solvents is generally greater than in the case of the unmodified resins and in some cases phthalide modified resins are soluble in solvents in which the unmodified resins do not dissolve at all. This adds a greater flexibility to the use of the resins of the present invention, particularly in coating compositions, as it widens the choice of solvents which can be used.

While, as has been pointed out above, in many cases plasticizers may be eliminated from compositions containing phthalide modified resins, it should be understood that in many cases it is desirable to add plasticizers, although frequently the quantity added may be considerably reduced. Any of the ordinary plasticizers for polyhydric alcohol-organic acid resins may be used. Of particular interest is phthalide itself and substituted phthalides, esters of keto aromatic acids such as benzoyl and naphthoyl benzoic acids, etc.

Among the polyhydric alcohols which may be used, glycerin and glycol are of the greatest commercial importance, but other polyhydric alcohols may be used, singly or in admixture, with glycerin or glycol, or both. Examples of such polyhydric alcohols are butylene oxide, chlorhydrines, ethylene oxide, glycerin ethers, polyglycerols, amylene glycol, butylene glycol, diethylene glycol, glycol methyl ether, glycol propyl ether, polyglycols, propylene glycol, triethylene glycol, 1-2 propylene glycol, 1-3 propylene glycol, 2-3 butylene glycol, mannitol, mannitol ethers, pentaerythrite, pentaerythrite ethers.

Phthalic anhydride is the most common dicarboxylic acid and because of its low price and excellent characteristics in resins containing it, it is of prime commercial importance. However, the invention is in no sense limited to the use of phthalic anhydride as the acid in the resins and on the contrary other acids, both polycarboxylic and monocarboxylic, may be used, singly or in admixture, to replace part or all of the phthalic anhydride.

Examples of the polycarboxylic acids which may be used as substituted phthalic anhydride such as halogen, nitro, or amino; and adipic, azelaic, boric, camphoric, citric, giglycolic, diphenic, fumaric, glutaric, maleic, malic, malomalic, mellitic, hemimellitic, naphthalic, terephthalic, tetrachlorphthalic, pyroacemic, sebacic, suberic, succinic, tartaric, and pyrotartaric acids.

Among the monocarboxylic acids which may be used are the following:—abietic, oxidized abietic, arachidic, acetic, acetoacetic, acrylic, hydroacrylic, anthranilic, behenic, benzoic, aminobenzoic, benzoylbenzoic, chlorbenzoic, halogen or nitrobenzoic, naphthoylbenzoic, nitrobenzoic, toluylbenzoic, cinnamic, hydrocinnamic, clupanodonic, congo, copal, erucic, formic, furoic, glutaric, glycolic, glyoxylic, hydroxybutyric, lactic, lauric, lignoceric, linolenic, mucic, myristic, naphthenic, naphthoic oleic, palmitic, propionic, pyruvic, rape oil, resin acids, ricinoleic, salicylic, stearic, dihydroxystearic, stearolic, toluic, tung oil, rich hydrogenated fatty acids, fat acids of castor oil, fatty acids of hydrogenated castor oil; fat acids of cocoanut oil, corn oil, cottonseed oil, drying oils, non-drying oils, fish oil, linseed oil, mahaden oil, perilla oil, rape-seed oil, soya-bean oil, sunflower seed oil, whale oil; glycerides of oils and fats; mixed fat acids of cocoabutter, castor oil, Japan wax; and heat distilled acids from castor oil, corn oil, cotton seed oil, fish oil, lard, linseed oil, peanut oil, rape-seed oil, soya-bean oil, tung oil.

In addition to unsubstituted phthalide substituted phthalides such as mono or dialkyl or aryl phthalides, alkylidene phthalides, and the like may be employed. Similarly, reduction products of phthalide such as hexahydrophthalide are likewise included.

In addition to the synthetic resins referred to above other synthetic resins may be present such as amine drying oil resins of the tung oil-toluidine type. Amino ketone resins, polymerized vinyl resins, polymerized styrol or itaconic acid resins, salts or keto aromatic acid with metals other than the alkali and alkaline earth metals, and the like.

Of course, where the product is to be used as molding compositions suitable fillers, dyes, pigments, and the like, may be incorporated. Of particular interest are colored lacquers which may be incorporated as described in the application of Lloyd C. Daniels and Alphons O. Jaeger, Serial No. 503,855, filed December 20, 1930.

In addition to the plasticizers referred to above, which are of general utility with polyhydric alcohol-organic acid resins, special plasticizers for special synthetic resins may be used where these resins are present, thus, for example, where urea or other amino resins are present. Nitrogen containing plasticizers such as phthalimide and its derivatives, polycarboxylic acid nitriles such as phthalonitrile, etc., may be used.

The present invention, of course, also, includes the combination of phthalide modified polyhydric alcohol-organic acid resins with unmodified polyhydric alcohol-organic acid resins with or without synthetic resins of an entirely different type as described above.

I do not claim in this application the phthalide modified polyhydric alcohol-organic acid resins as new chemical products, this forming the subject matter of my copending application, Serial No. 551,798, filed July 18, 1931.

On the contrary the present application is limited to compositions in which these modified resins are associated with other synthetic resins.

The invention will be illustrated in greater detail in the following specific examples, which illustrate typical compositions falling within the scope of the invention.

*Example 1*

A glycerine phthalic anhydride phthalide resin is prepared by heating 1 mol of glycerine and 1 mold of phthalic anhydride at 180° C. until evolution of gas ceases, adding 1 mol of phthalide and continuing the heating at 210° C. until a test portion withdrawn on a glass rod solidifies to a hard product, which is not sticky. This resin is mixed with an equal weight of a phenol formaldehyde or phenol furfural resin capable of being hardened by heat together with a wood flour filler and, if desired, sufficient pigment to thoroughly color the mixture. Preferably the resins and fillers are ground together to form a thoroughly homogeneous powder. To this powder may be added an amount of dibutyl phthalate equal to about 5% of the weight of the two resins. The powder can be molded in the ordinary hot molds or, if desired, by a process of chill molding involving preheating of the resin. Products obtained have an excellent strength and are capable of taking a high polish.

*Example 2*

A resin is prepared as in Example 1, but instead of using equimolecular proportions of phthalic anhydride and phthalide, 1 mol phthalic anhydride, ½ mol of phthalide and ½ mol of benzoic acid are used. The resin is somewhat softer than that according to description of Example 1 and is mixed with a formaldehyde urea or formaldehyde urea thiourea resin, the amount of a modified glycerine organic acid resin being from 1½ to 2 times that of the urea resin. A small amount of a plasticizer such as toluene sulfonamide or a mixture of ethanol phthalimide and butyl naphthoyl benzoate is incorporated in the resin mixture and the whole is ground with cotton flock or wood flour. The amount of plasticizer can preferably be about 2-6% of the weight of the resins. A molding powder is obtained which can be molded to milky white products or, if desired, suitable colors may be added. The product is less brittle than when urea resins are used alone and is very suitable for the molding of table ware, such as plates, tumblers, and the like.

Example 3

A resin is prepared under the conditions of Example 1, but instead of 1 mol of phthalic anhydride and 1 mol of phthalide, .75 mol of phthalic anhydride, 1 mol of phthalide or ethyl phthalide and .5 mol of fatty acids of cocoanut oil are used. A soft flexible resin is obtained and this is mixed with a polymerized vinyl resin in about equal proportions and dissolved in a suitable solvent to form a thoroughly fluid composition which is used for impregnating paper or similar products. If harder products are desired, the resin may be hardened by heating, but normally the resin mixture will not be transformed into an infusible product.

Example 4

A resin is prepared under the temperature conditions in Example 1, using 2 mols of ethylene glycol, 1 mol of phthalic anhydride, 1 mol of phthalide or hexahydrophthalide and 1 mol of the fat acids from cocoanut oil. A soft balsam-like resin is obtained which is mixed with about twice its weight of a glycerine phthalate resin which has been modified by substituting oleic acid for 10% of the phthalic acid. Preferably a small amount of an antacid such as urea or toluidine is added so as to produce a resin composition of low acid number. Sufficient solvent is added to obtain a rather viscous enamel, which is used in enameling copper wire for electric purposes. The film obtained is considerably softer than when an ordinary glyceryl phthalate resin is used and does not show any tendency to crack when the wire is bent, even on a comparatively narrow radius.

Example 5

A modified resin is prepared under the reaction conditions of Example 1, using 1 mol of glycerine, ½ mol of phthalic anhydride, ½ mol of maleic acid and 1 mol of phthalide or monophenyl phthalide. If desired, a corresponding amount of polyglycerols may be used instead of a glycerine. The resin is mixed with 30% of its weight of a light colored zinc or aluminum benzoylbenzoate and 70% of its weight of a modified glycerine phthalate resin in which 1 mol of glycerine is caused to react with 1 mol of phthalic anhydride and 1 mol of abietic acid. The resins are dissolved up in a suitable solvent containing acetone butyl alcohol and about 20% of toluene. If desired, 10% of the weight of the resin of diethyl or dibutyl phthalate may be added. A lacquer is obtained which leaves a strong film on evaporation of the solvent.

In the claims the expression "phthalide substance" is intended to cover phthalide, its substitution and hydrogenation products. Wherever the word "phthalide" is used alone in a claim, the unsubstituted phthalide is meant.

What is claimed as new is:

1. A synthetic resin composition containing at least one resin of the polyhydric alcohol-organic acid type, in which a portion of the acid is replaced by a phthalide substance and at least one synthetic resin which does not contain any phthalide substance.

2. A synthetic resin composition containing at least one resin of the polyhydric alcohol-organic acid type, in which a portion of the acid is replaced by phthalide and at least one synthetic resin which does not contain any phthalide substance.

3. A resin composition according to claim 1, in which at least one of the other synthetic resins is a phenol aldehyde resin.

4. A resin composition according to claim 2, in which at least one of the other synthetic resins is a phenol aldehyde resin.

5. A resin composition according to claim 1, in which at least one of the other synthetic resins is a urea resin.

6. A resin composition according to claim 2, in which at least one of the other synthetic resins is a urea resin.

7. A synthetic resin composition containing a synthetic resin which is a condensation product of at least one polyhydric alcohol, at least one polybasic organic carboxylic acid, at least one phthalide substance and at least one synthetic resin which does not contain any phthalide substance.

8. A synthetic resin composition containing a synthetic resin which is a condensation product of at least one polyhydric alcohol, at least one polybasic organic carboxylic acid phthalide and at least synthetic resin which does not contain any phthalide substance.

9. A synthetic resin composition containing a synthetic resin which is a condensation product of at least one polyhydric alcohol, at least one polycarboxylic acid and at least one monocarboxylic acid, at least one phthalide substance and at least one synthetic resin which does not contain any phthalide substance.

10. A synthetic resin composition containing a synthetic resin which is a condensation product of at least one polyhydric alcohol, phthalic anhydride, at least one phthalide substance and at least one synthetic resin which does not contain any phthalide substance.

11. A synthetic resin composition containing a synthetic resin which is a condensation product of at least one polyhydric alcohol, phthalic anhydride, phthalide and at least one synthetic resin which does not contain any phthalide substance.

12. A synthetic resin composition containing a condensation product of glycerine phthalic anhydride and a phthalide substance and at least one other synthetic resin which does not contain a phthalide substance.

13. A synthetic resin composition containing a condensation product of glycerine phthalic anhydride and phthalide and at least one other synthetic resin which does not contain a phthalide substance.

14. A resin composition according to claim 12, in which at least one of the other synthetic resins is a phenol aldehyde resin.

15. A resin composition according to claim 12, in which at least one of the other synthetic resins is a urea resin.

16. A synthetic resin composition according to claim 1, in which at least one of the other synthetic resins is a polyhydric alcohol-organic acid resin free from phthalide substances.

17. A synthetic resin composition according to claim 12, in which at least one of the other synthetic resins is a polyhydric alcohol-organic acid resin free from phthalide substances.

Signed at Pittsburgh, Pennsylvania, this 18th day of July, 1931.

ALPHONS O. JAEGER.